US012645512B1

(12) United States Patent
Salazar et al.

(10) Patent No.: US 12,645,512 B1
(45) Date of Patent: Jun. 2, 2026

(54) EVALUATION AND VALIDATION OF APPLICATION PROGRAMMING INTERFACE REQUESTS AND RESPONSES FOR MICROSERVICES APPLICATIONS

(71) Applicant: KONG INC., San Francisco, CA (US)

(72) Inventors: Guilherme Salazar, Goiânia (BR); Thijs Schreijer, Hengelo (NL)

(73) Assignee: KONG INC., San Francisco, CA (US)

( * ) Notice: Subject to any disclaimer, the term of this patent is extended or adjusted under 35 U.S.C. 154(b) by 736 days.

(21) Appl. No.: 18/090,324

(22) Filed: Dec. 28, 2022

(51) Int. Cl.
$G06F\ 9/54$ (2006.01)
$G06F\ 21/64$ (2013.01)

(52) U.S. Cl.
CPC .............. *G06F 9/543* (2013.01); *G06F 21/64* (2013.01)

(58) Field of Classification Search
None
See application file for complete search history.

(56) References Cited

U.S. PATENT DOCUMENTS

2005/0198154 A1* 9/2005 Xie ..................... H04L 61/4541
709/206
2009/0307143 A1* 12/2009 Reistad ................ G06Q 50/188
705/80

2017/0041296 A1* 2/2017 Ford ....................... G06F 21/64
2018/0373663 A1* 12/2018 Shanley ................. G06F 9/544
2019/0297071 A1* 9/2019 Canavor ................. G06F 21/45

OTHER PUBLICATIONS

Gadge et al.; "Microservice Architecture: API Gateway Considerations"; Aug. 2017; GlobalLogic Organisations; pp. 1-13 (Year: 2017).*
Zhao et al.; "Management of API Gateway Based on Microservice Architecture"; 2018; Journal of Physics: Conference Series, vol. 1087, No. 3; IOP Publishing; pp. 1-8. (Year: 2018).*

* cited by examiner

*Primary Examiner* — Umut Onat
(74) *Attorney, Agent, or Firm* — Perkins Coie LLP; Colin Fowler

(57) ABSTRACT

A method for evaluating and validating requests before they reach one or more services in a microservice application, each service being an application program interface (API) performing a piecemeal function of an overall application function, including receiving an API message and comparing the body thereof to a schema; based on that comparison either forwarding the message on as normal in the event of a successful comparison and generating an error message when the comparison fails. In some embodiments, the schema implements Open API Specification Validation.

17 Claims, 5 Drawing Sheets

EVALUATION AND VALIDATION OF APPLICATION PROGRAMMING INTERFACE REQUESTS AND RESPONSES FOR MICROSERVICES APPLICATIONS

TECHNICAL FIELD

The disclosure relates to distributed microservice application networks and more particularly to architecture and data flow between application programming interfaces.

BACKGROUND

Application programming interfaces (APIs) are specifications primarily used as an interface platform by software components to enable communication with each other. For example, APIs can include specifications for clearly defined routines, data structures, object classes, and variables. Thus, an API defines what information is available and how to send or receive that information.

Microservices are a software development technique-a variant of the service-oriented architecture (SOA) architectural style that structures an application as a collection of loosely coupled services (embodied in APIs). In a microservices architecture, services are fine-grained and the protocols are lightweight. The benefit of decomposing an application into different smaller services is that it improves modularity. The improvement to modularity makes the application easier to understand, develop, test, and become more resilient to architecture erosion. Microservices parallelize development by enabling small autonomous teams to develop, deploy and scale their respective services independently. Microservice-based architectures enable continuous delivery and deployment.

Setting up multiple APIs is a time-consuming challenge because deploying an API requires tuning the configuration or settings of each API individually. The functionalities of each individual API are confined to that specific API and servers hosting multiple APIs are individually set up for hosting the APIs, which makes it very difficult to build new APIs or even scale and maintain existing APIs. Maintaining APIs becomes even more challenging when there are tens of thousands of APIs and millions of clients requesting API-related services per day. Consequently, visualizing these APIs is a tedious and cumbersome activity.

DETAILED DESCRIPTION

Figure 1:
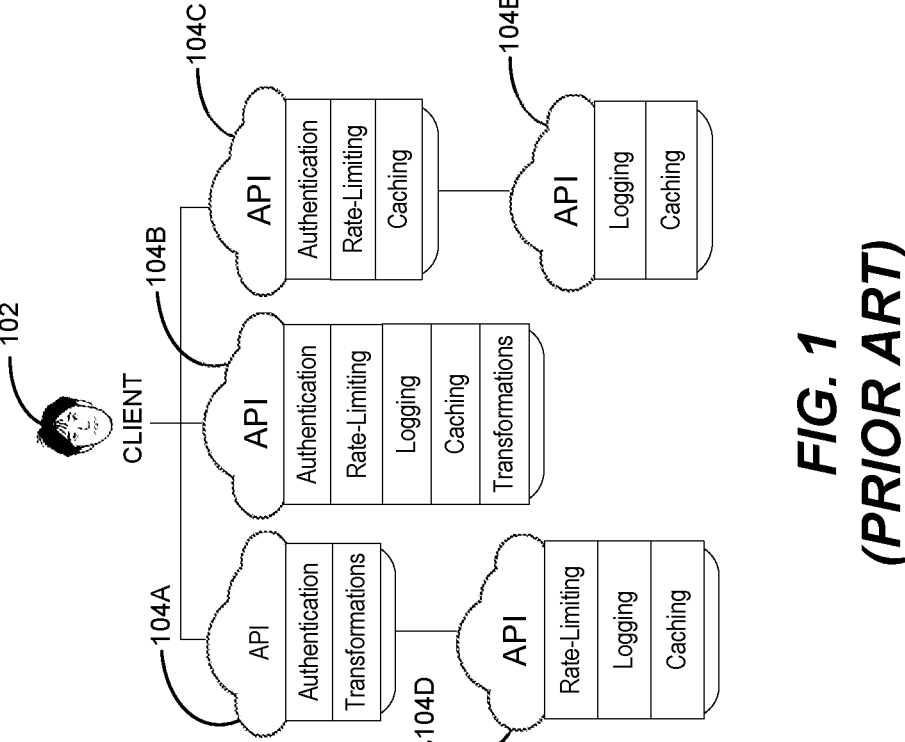
FIG. 1 illustrates a prior art approach with multiple APIs having functionalities common to one another.

In a microservices application architecture, programming each of the services requires an attention to detail and knowledge of one or more programming languages. Furthermore, requests and responses to and from each service in the microservices application must be formatted correctly in order to effectively use the diverse range of applications offered by the microservices application architecture.

To this end, microservices application validation methodologies are crucial for the development and maintenance of microservices application architectures. However, existing validation methodologies that are deployed to validate enterprise systems are ill-suited to work in the context of microservices applications because each microservice may be written and configured differently.

The disclosed technology describes how to implement a validation methodology for each service of a microservices application. In an example, this is achieved by using a plugin (or a browser extension) associated with each service that is configured to validate both incoming requests and outgoing responses for that respective service. The plugin can be advantageously configured to use any underlying validator and can be enabled for services, route objects, customer objects, or globally.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure are directed at systems, methods, and architecture for the validation of microservices APIs that together comprise an application. The architecture is a distributed cluster of gateway nodes that jointly provide APIs. As a result of a distributed architecture, the task of API management is distributed across a cluster of gateway nodes or even web services. For example, some APIs that make up the microservices application architecture run on Amazon AWS®, whereas others operate on Microsoft Azure®. It is feasible that the same API runs multiple instances (e.g., multiple workers) on both AWS and Azure (or any other suitable web hosting service).

The gateway nodes effectively become the entry point for API-related requests from users. Requests that operate in between APIs (e.g., where one API communicates to another API) may have architecturally direct communication, though indicate communications/request response transactions to a control plane via data plane proxies. In some embodiments, inter-API requests pass through a gateway depending on network topology, API configuration, or stewardship of an associated API. The disclosed embodiments are well-suited for use in mission critical deployments at small and large organizations. Aspects of the disclosed technology do not impose any limitation on the type of APIs. For example, these APIs can be proprietary APIs, publicly available APIs, or invite-only APIs, each of which is configured to use a plugin (or browser extension) for validation.

FIG. 1 illustrates a prior art approach with multiple APIs having functionalities common to one another. As shown in FIG. 1, a client 102 is associated with APIs 104A, 104B, 104C, 104D, and 104E. Each API has a standard set of features or functionalities associated with it. For example, the standard set of functionalities associated with API 104A are "authentication" and "transformations." The standard set of functionalities associated with API 104B are "authentication," "rate-limiting," "logging," "caching," and "transformations." Thus, "authentication" and "transformations" are functionalities that are common to APIs 104A and 104B. Similarly, several other APIs in FIG. 1 share common functionalities. However, it is noted that having each API handle its own functionalities individually causes duplication of efforts and code associated with these functionalities, which is inefficient. The inefficiency problem becomes significantly more challenging when there are tens of thousands of APIs and millions of clients requesting API-related services per day.

Figure 2:
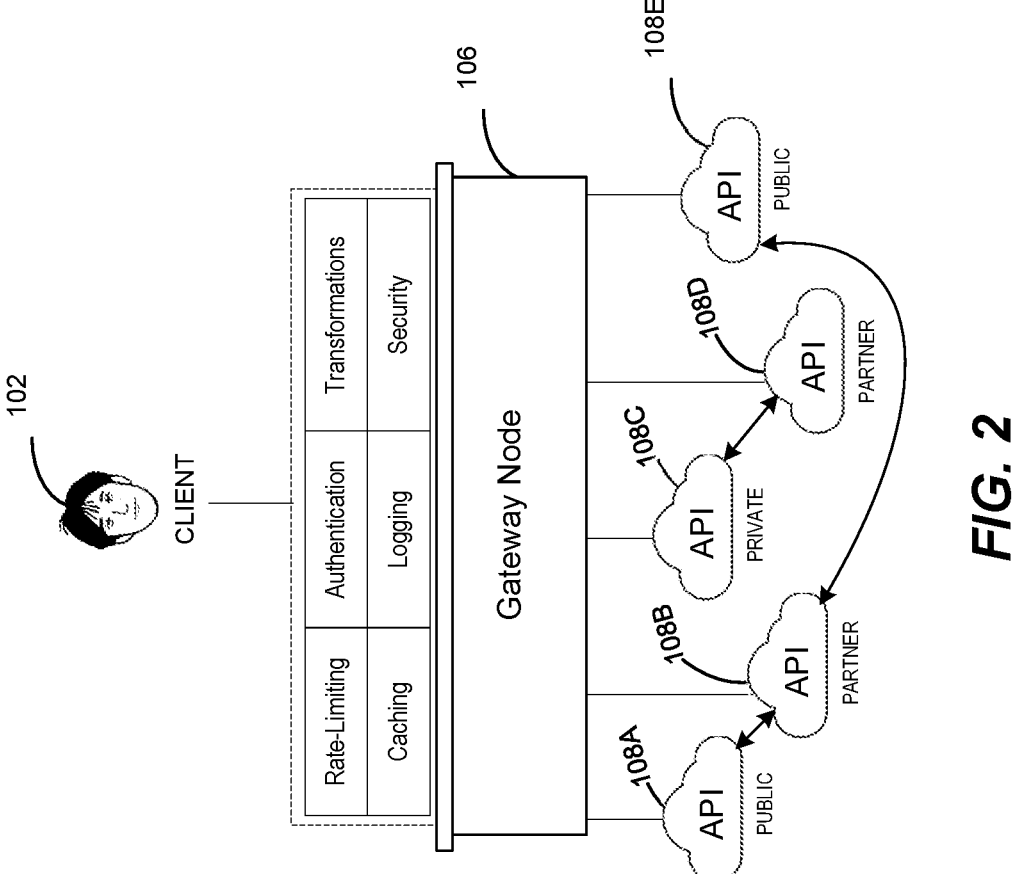
FIG. 2 illustrates a distributed API gateway architecture, according to an embodiment of the disclosed technology.

FIG. 2 illustrates a distributed API gateway architecture according to an embodiment of the disclosed technology. To address the challenge described in connection with FIG. 1, the disclosed technology provides a distributed API gateway architecture as shown in FIG. 2. Specifically, disclosed embodiments implement common API functionalities by bundling the common API functionalities into a gateway node 106 (also referred to herein as an API Gateway). Gateway node 106 implements common functionalities as a core set of functionalities that runs in front of APIs 108A, 108B, 108C, 108D, and 108E. The core set of functionalities include rate limiting, caching, authentication, logging, transformations, and security. It will be understood that the above-mentioned core set of functionalities are for examples and illustrations. There can be other functionalities included in the core set of functionalities besides those discussed in FIG. 2. In some applications, gateway node 106 helps launch large-scale deployments in a very short time at reduced complexity and is therefore an inexpensive replacement for expensive proprietary API management systems.

The common functionalities being bundled in the gateway API enables client requests to be directed to the gateway API and then forwarded to the specific service (and corresponding API) that is being requested. The service receiving the request typically authenticates, authorizes, and validates the incoming request prior to the corresponding services being provided to the requesting client.

Embodiments of the disclosed technology provide, among others, the following advantages and benefits:

Any underlying validator can be implemented. The described embodiments can be configured to use any validator to validate the schema of the body and/or parameters of a request or response. In some embodiments, the the validator implemented is OAS validation (Open API Specification Validation). The policy enables one to validate an incoming request or response message against an OpenAPI 3.0 Specification (JSON or YAML). In said embodiments, the comparison is being performed by a plugin or service extension installed at an API gateway to a microservice application.

Compatible with DB-less implementations. The plugin can be implemented with gateways that do not use a database and only rely on in-memory storage for storing configured entities (e.g., routes, services, etc.). In this example, the plugin is configured declaratively (as compared to imperatively).

Plugin can be enabled for any microservice object. Services, routes associated with services, and consumers (e.g., users of the service) can use the described embodiments to validate requests and responses. Alternatively, the plugin can be enabled globally.

In some embodiments, the plugin for validating requests and responses is configured using the parameters shown in Table 1.

TABLE 1

| Example configuration parameters for plugin | | |
| --- | --- | --- |
| Parameter | Type | Description |
| name | String | The name of the plugin, in this case request-validator. |
| service.name, service.id | String | The name or ID of the service the plugin targets. Set one of these parameters if adding the plugin to a service through the top-level/plugins endpoint. Not required if using /services/SERVICE_NAME\|SERVICE_ID/plugins. |
| route.name, route.id | String | The name or ID of the route the plugin targets. Set one of these parameters if adding the plugin to a route through the top-level/plugins endpoint. Not required if using |

TABLE 1-continued

| Example configuration parameters for plugin | | |
|---|---|---|
| Parameter | Type | Description |
| consumer.name, consumer.id | String | routes/ROUTE_NAME|ROUTE_ID/plugins. The name or ID of the consumer the plugin targets. Set one of these parameters if adding the plugin to a consumer through the top-level/plugins endpoint. Not required if using /consumers/CONSUMER_NAME|CONSUMER_ID/ plugins. |
| enabled | Boolean | Whether this plugin will be applied. |
| config.body_ schema semi-optional | String | The request body schema specification. One of body_schema or parameter_schema must be specified. |
| config.allowed_ content_types | Set of string elements | Holds a default value of: ["application/json"] List of allowed content types. The value can be configured with the charset parameter. For example, application/json; charset = UTF-8. Note: Body validation is only done for application/json and skipped for any other allowed content types. Only one parameter is supported at the most. If a request is sending more than one parameter with the Content-Type header, only the first parameter is evaluated and the rest are truncated. Note that application/json doesn't match with application/json; charset = UTF-8. The type, subtype, parameter names, and the value of the charset parameter are not case sensitive based on the RFC explanation. |
| config.version | String | Which validator to use. Supported values are kong (default) for using Kong's own schema validator, or draft4 for using a JSON Schema Draft 4-compliant validator. |
| config.param eter_schema | Array of record elements | Array of parameter validator specifications. For details and examples, see Parameter Schema Definition. One of body_schema or parameter_schema must be specified. |
| config.verbose_ response | Boolean | Holds a default value of False. If enabled, the plugin returns more verbose and detailed validation errors (for example, the name of the required field that is missing). |

In some embodiments, the plugin or browser extension uses specific validators that are configured to perform specific validations for fields in the body and/or parameters of the request or response. Examples of specific validators are shown in Table 2.

TABLE 2

| Examples of specific validators | | |
|---|---|---|
| Validator | Applies to | Description |
| between | Integers | Whether the value is between two integers. Specified as an array; for example, {1, 10} |
| len_eq | Arrays, Maps, Strings | Whether an array's length is a given value |
| len_min | Arrays, Maps, Strings | Whether an array's length is at least a given value |
| len_max | Arrays, Maps, strings | Whether an array's length is at most a given value |
| match | Strings | True if the value matches a given Lua pattern ** |
| not_match | String | True if the value doesn't match a given Lua pattern ** |
| match_all | Arrays | True if all strings in the array match the specified Lua pattern ** |
| match_none | Arrays | True if none of the strings in the array match the specified Lua pattern ** |
| match_any | Arrays | True if any one of the strings in the array |

TABLE 2-continued

| Examples of specific validators | | |
|---|---|---|
| Validator | Applies to | Description |
| | | matches the specified Lua pattern ** |
| starts_with | Strings | True if the string value starts with the specified substring |
| one_of | Strings, Numbers, Integers | True if the string field value matches one of the specified values |
| timestamp | Integers | True if the field value is a valid timestamp |
| uuid | Strings | True if the string is a valid UUID |

In some embodiments, the plugin or browser extension uses semantic validation (instead of structural or syntactical validation) to validate a fixed subset of values. As compared to structural validation, which performs a literal comparison between fields or values (i.e., the syntax) in the two schema, semantic validation enforces correctness of the fields or values in a specific context. For example, if one schema included the field LastName and the other schema included the field FamilyName, then a semantic validator would find these to be matching, whereas a structural validator might not.

In an example, semantic validation in the disclosed embodiments is used for values that are described by authoritative resources, e.g., RFCs or other external specifications. Examples of values that are semantically validated include "date," "date-time," and "time" (e.g., defined by RFC 3339, section 5.6).

Figure 3:
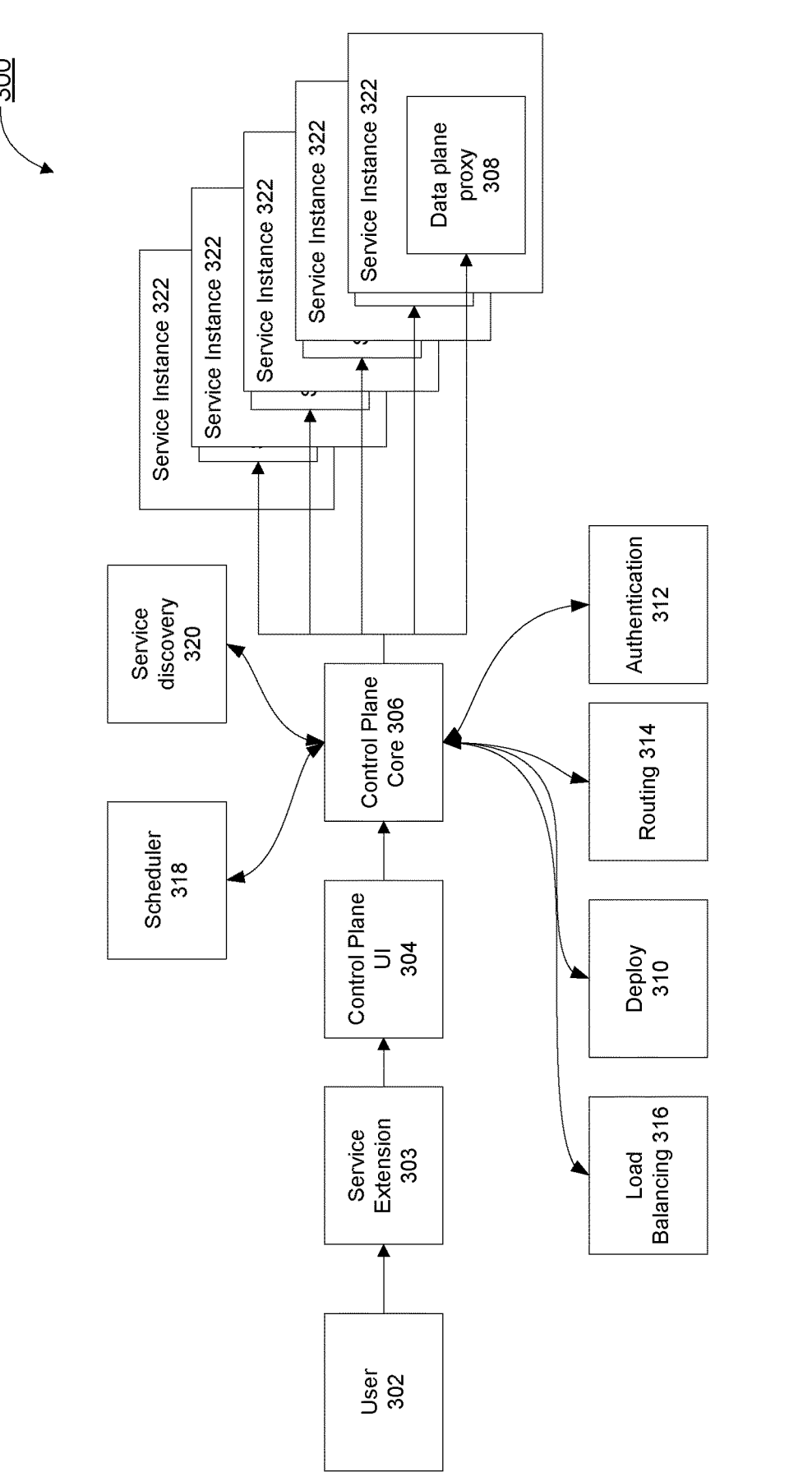
FIG. 3 is a block diagram of a control plane system for a service mesh in a microservices architecture.

FIG. 3 is a block diagram of a control plane system 300 for a service mesh in a microservices architecture that illustrates the integration of a plugin for validating requests and responses. A service mesh data plane is controlled by a control plane. In a microservices architecture, each microservice typically exposes a set of what are typically fine-grained endpoints, as opposed to a monolithic application where there is just one set of (typically replicated, load-balanced) endpoints. In the example shown in FIG. 3, an endpoint is considered to be a URL pattern used to communicate with an API.

Service mesh data plane: Touches every packet/request in the system. Responsible for service discovery, health checking, routing, load balancing, authentication/authorization, and observability.

Service mesh control plane: Provides policy and configuration for all of the running data planes in the mesh. Does not touch any packets/requests in the system but collects the packets in the system. The control plane turns all the data planes into a distributed system.

A service mesh such as Linkerd, NGINX, HAProxy, Envoy co-locate service instances with a data plane proxy network proxy. Network traffic (HTTP, REST, gRPC, Redis, etc.) from an individual service instance flows via its local data plane proxy to the appropriate destination. Thus, the service instance is not aware of the network at large and only knows about its local proxy. In effect, the distributed system network has been abstracted away from the service programmer. In a service mesh, the data plane proxy performs a number of tasks. Example tasks include service discovery, health checking, routing, load balancing, authentication and authorization, and observability.

Service discovery identifies each of the upstream/backend microservice instances within used by the relevant application. Health checking refers to detection of whether upstream service instances returned by service discovery are ready to accept network traffic. The detection includes both active (e.g., out-of-band pings to an endpoint) and passive (e.g., using 3 consecutive 5xx as an indication of an unhealthy state) health checking. The service mesh is further configured to route requests from local service instances to desired upstream service clusters.

Load balancing: Once an upstream service cluster has been selected during routing, a service mesh is configured load balance. Load balancing includes determining which upstream service instance should the request be sent; with what timeout; with what circuit breaking settings; and if the request fails, should it be retried?

The service mesh further authenticates and authorizes incoming requests cryptographically using mTLS or some other mechanism. Data plane proxies enable observability features including detailed statistics, logging, and distributed tracing data, which are generated so that operators understand distributed traffic flow patterns and debug problems as they occur.

In effect, the data plane proxy is the data plane. Said another way, the data plane is responsible for conditionally translating, forwarding, and observing every network packet that flows to and from a service instance.

The network abstraction that the data plane proxy provides does not inherently include instructions or built-in methods to control the associated service instances in any of the ways described above. The control features are the enabled by a control plane. The control plane takes a set of isolated stateless data plane proxies and turns them into a distributed system.

A service mesh and control plane system 300 includes a user 302 whom interfaces with a control plane UI 304 through a service extension 303 that validates requests and responses, in accordance with the described embodiments. In the example of FIG. 3, the service extension is a plugin. The UI 304 might be a web portal, a CLI, or some other interface. Through the UI 304, the user 302 has access to the control plane core 306. The control plane core 306 serves as a central point that other control plane services operate through in connection with the data plane proxies 308. Ultimately, the goal of a control plane is to set policy that will eventually be enacted by the data plane. More advanced control planes will abstract more of the system from the operator and require less handholding.

In some examples, control plane services include global system configuration settings such as deploy control 310 (blue/green and/or traffic shifting), authentication and authorization settings 312, route table specification 314 (e.g., when service A requests a command, what happens), load balancer settings 316 (e.g., timeouts, retries, circuit breakers, etc.), a workload scheduler 318, and a service discovery system 320. The scheduler 318 is responsible for bootstrapping a service 322 along with its data plane proxy 308. Services 322 are run on an infrastructure via some type of scheduling system (e.g., Kubernetes® or Nomad). Typical control planes operate in control of control plane services 310-320 that in turn control the data plane proxies 308. Thus, in typical examples, the control plane services 310-320 are intermediaries to the services 322 and associated data plane proxies 308.

As depicted in FIG. 3, the control plane core 306 is the intermediary between the control plane services 310-320 and the data plane proxies 308. Acting as the intermediary, the control plane core 306 removes dependencies that exist in other control plane systems and enables the control plane core 306 to be platform agnostic. The control plane services 310-320 act as managed stores. With managed storages in a cloud deployment, scaling and maintaining the control plane core 306 involves fewer updates. In some examples, the control plane core 306 is split to multiple modules during implementation.

The control plane core 306 passively monitors each service instance 322 via the data plane proxies 308 via live traffic. However, in other instances, the control plane core 306 takes active checks to determine the status or health of the overall application.

The control plane core 306 supports multiple control plane services 310-320 at the same time by defining which one is more important through priorities. Employing a control plane core 306 as disclosed aids control plane service 310-320 migration. Where a user wishes to change the control plane service provider (ex: changing service discovery between Apache Zookeeper™ based discovery to switch to Consul based discovery), a control plane core 306 that receives the output of the control plane services 310-320 from various providers configures each service regardless of provider. Conversely, a control plane that merely directs control plane services 310-320 includes no such configuration store.

Another feature provided by the control plane core 306 is static service addition. For example, a user running Consul may want to add another service/instance (ex: for debugging). However, the user may not want to add the additional service on the Consul cluster. In this example, using the control plane core 306 enables the user to plug the file-based source with custom definition multi-datacenter support. The user exposes the state hold in control plane core 306 as an HTTP endpoint, and plugs the control plane core 306 from other datacenters as a source with lower priority, which provides fallback for instances in the other datacenters when instances from local datacenter are unavailable.

Figure 4:
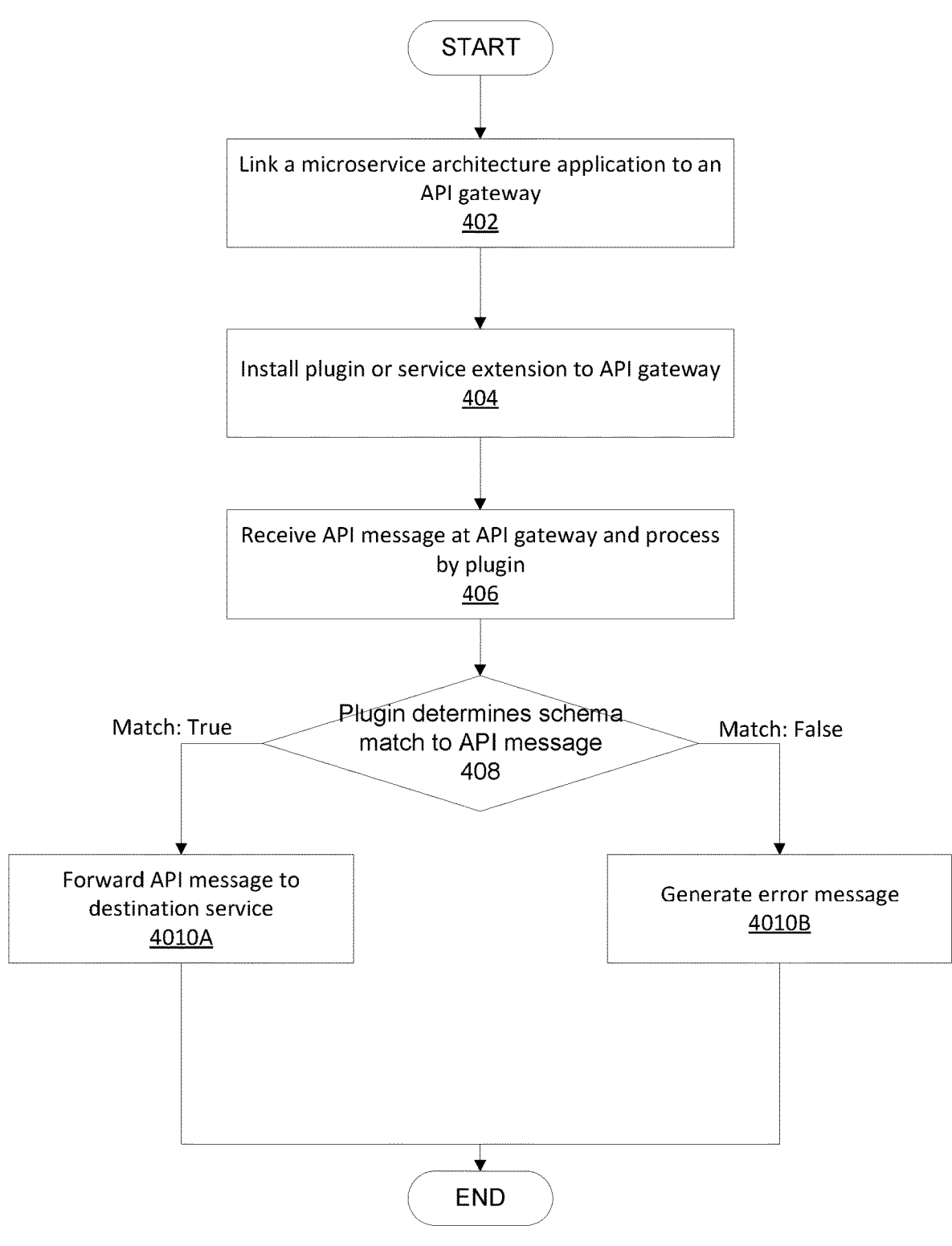
FIG. 4 is a flowchart illustrating a method of authorizing requests in a microservices architecture application.

FIG. 4 is a flowchart illustrating a method 400 of evaluating and validating a request to a service of a plurality of services that form a microservices architecture application, where each of the plurality of services is an application program interface (API) performing a piecemeal function of an overall application function. In an example, the method is implemented in a service extension.

In operation 402, an application program interface (API) gateway is linked to a microservice architecture application including a plurality of services that interact to perform an overall application function, each of the plurality of services being an API performing a piecemeal function of the overall application function. The linking of the API gateway to the microservice application is performed either by an administrator or an automated process by which a set of software instructions automatically connect the API gateway to available APIs of the microservice application via a set of network addresses associated with each API.

In operation 404, either an administrator or an automated process installs a plugin or service extension at the API gateway. The plugin evaluates messages received at the API gateway, wherein the plugin is enabled for an object associated with the microservice architecture application. In some embodiments, the plugin is a browser extension.

In operation 406, the API gateway receives a message that is handled by the plugin. The embodiments of the message include a message body and/or a destination service.

In operation 408, the plugin determines whether a schema of the message body matches a reference schema associated with a configuration of the plugin. The configuration of the plugin includes any combination of an identifier for the destination service, a Boolean flag indicative of the plugin being enabled or disabled, a specification of the reference schema, an identifier of a validator that is configured to generate either determination result, and/or a set of parameters for the validator. In some embodiments, the validator is a Kong schema validator or a JAVASCRIPT Object Notation (JSON) Schema Draft 4-compliant validator.

In some embodiments, the determination of the matching schema includes generation of a Boolean indicative of a schema of the request body being identical to a reference schema associated with a configuration of the service extension. The compared schema elements include a set of parameters in each of the message body and the reference schema.

Matching parameters are compared one-to-one where available. In some embodiments, the parameters are compared only on a basis of parameter names, and some embodiments compared both the parameter names and the values held by those parameters.

In operations 410A and 410B, the plugin either: (A) transmits instructions to the API gateway to forward to forward the message (e.g., to the destination service) upon a determination that the schema of the message body matches the reference schema or (B) generates an error message indicative of an error in the message body upon a determination that the schema of the message body does not match the reference schema. In some embodiments, the error message is delivered to the control plane for further handling.

In embodiments that make use of a Boolean result, where the determination that the Boolean result is true, transmitting the request to the service. Conversely, upon a determination that the Boolean result is false, transmitting, to the client, a message indicative of an error in the request.

Embodiments of the disclosed technology provide a system that includes A system comprising: a microservice architecture application, and a plugin or service extension. Further apparatus that is used in some embodiments includes an API gateway that is networked with a plurality of microservices of the microservice architecture application. The plugin or service extension are installed on the API gateway. The plugin is configured and enabled to perform the method described above.

Figure 5:
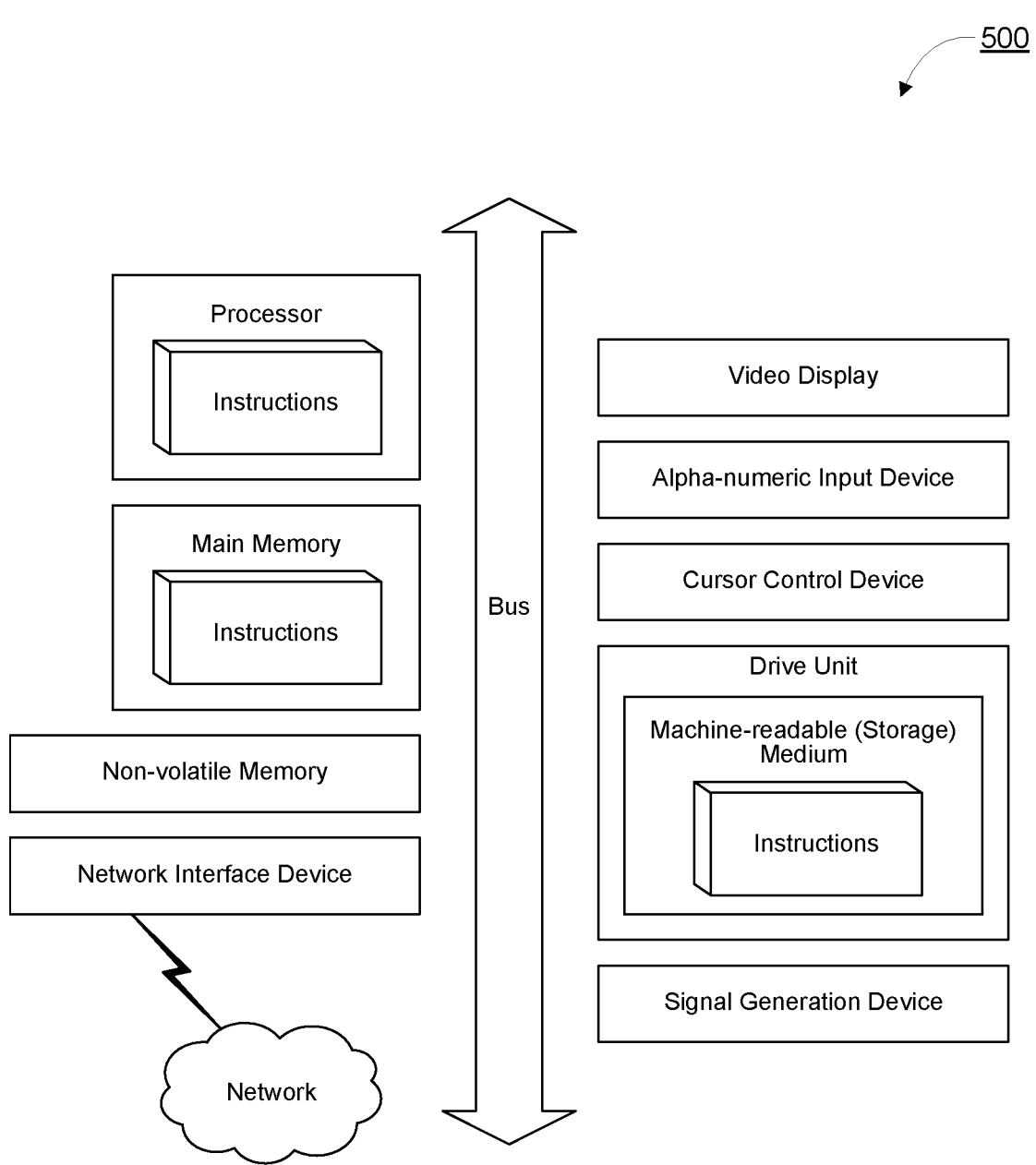
FIG. 5 depicts a diagrammatic representation of a machine in the example form of a computer system within a set of instructions, causing the machine to perform any one or more of the methodologies discussed herein, to be executed.

FIG. 5 shows a diagrammatic representation of a machine in the example form of a computer system 500, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

All patents, applications and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

What is claimed is:

1. A method of evaluating and validating a request to a service of a plurality of services that form a microservices architecture application, each of the plurality of services being an application program interface (API) performing a piecemeal function of an overall application function, the method being implemented in a service extension, and the method comprising:

receiving, from a client, the request comprising a request body, wherein the request is intercepted before reaching the service;

retrieving a configuration of the service extension, the configuration comprising an identifier for the service, a Boolean flag indicative of the service extension being enabled or disabled, a specification of a reference schema, an identifier of a validator that is configured to generate a Boolean result, and a set of parameters for the validator;

generating, by the validator identified in the configuration and using the set of parameters for the validator, the Boolean result indicative of a schema of the request body being identical to the reference schema associated with a configuration of the service extension, wherein generating the Boolean result comprises comparing a type of each parameter of the request body to a type of each corresponding parameter in the reference schema; and upon a determination that the Boolean result is false, transmitting, to the client, a message indicative of an error in the request, wherein the request is prevented from reaching the service.

2. The method of claim 1, wherein the schema of the request body comprises a first set of parameters, wherein the reference schema comprises a second set of parameters, and wherein generating the Boolean result comprises:

comparing a type of each parameter of the first set of parameters to the type of each corresponding parameter in the second set of parameters.

3. The method of claim 1, wherein the service extension is a plugin.

4. The method of claim 1, wherein the service extension is a browser extension.

5. The method of claim 1, wherein the validator is a Kong schema validator or a validator compliant with a schema definition language for describing a structure and validation constraints of data objects.

6. The method of claim 1, wherein the Boolean result is further indicative of a value of a parameter of the schema of the request body being semantically identical to a value of a corresponding parameter of the reference schema.

7. A system comprising:

one or more processors;

a memory including instructions, that when executed by the one or more processors, cause implementation of a microservice architecture application comprising a plurality of services that interact to perform an overall application function, each of the plurality of services being an application program interface (API) performing a piecemeal function of the overall application function; and execution of the instructions by the one or more processors further cause the implementation of a plugin, wherein the plugin is enabled for an object associated with the microservice architecture application, and wherein the plugin is configured to:

receive a message comprising a message body, wherein the message is intercepted before reaching a service of the plurality of services, retrieve a configuration of the plugin, the configuration comprising an identifier for the service, a Boolean flag indicative of the plugin being enabled or disabled, a specification of a reference schema, an identifier of a validator that is configured to generate a Boolean result, and a set of parameters for the validator;

generate, by the validator identified in the configuration and using the set of parameters for the validator, the Boolean result indicative of a schema of the message body being identical to the reference schema associated with the configuration of the plugin, wherein generating the Boolean result comprises comparing a type of each parameter of the message body to a type of each corresponding parameter in the reference schema; and transmit, upon a determination that the Boolean result is false, an error message indicative of an error in the message body, wherein the message is prevented from reaching the service.

8. The system of claim 7, wherein the object is a service of the plurality of services, a route object associated with the service, or a consumer object that is a user of the service.

9. The system of claim 7, wherein the message is a request to a service of the plurality of services or a response from the service.

10. The system of claim 7, wherein the schema of the message body comprises a first set of parameters, wherein the reference schema comprises a second set of parameters, and wherein generating said forwarding and transmitting further comprises:

comparing a type of each parameter of the first set of parameters to the type of each corresponding parameter in the second set of parameters.

11. The system of claim 7, wherein the plugin is a browser extension.

12. The system of claim 7, wherein the validator is a Kong schema validator or a validator compliant with a schema definition language for describing a structure and validation constraints of data objects.

13. The system of claim 7, wherein the Boolean result is further indicative of a value of a parameter of the schema of the message body being semantically identical to a value of a corresponding parameter of the reference schema.

14. A method comprising:

linking an application program interface (API) gateway to a microservice architecture application including a plurality of services that interact to perform an overall application function, each of the plurality of services being an API performing a piecemeal function of the overall application function;

installing a plugin at the API gateway that evaluates messages received at the API gateway, wherein the plugin is enabled for an object associated with the microservice architecture application;

receiving a message at the plugin comprising a message body, wherein the message is intercepted at the API gateway before reaching a service of the plurality of services;

retrieving a configuration of the plugin, the configuration comprising an identifier for the service, a Boolean flag indicative of the plugin being enabled or disabled, a specification of a reference schema, an identifier of a validator that is configured to generate a Boolean result, and a set of parameters for the validator;

generating, by the validator identified in the configuration and using the set of parameters for the validator, the Boolean result indicative of a schema of the message body being identical to the reference schema associated with the configuration of the plugin, wherein generating the Boolean result comprises comparing a type of each parameter of the message body to a type of each corresponding parameter in the reference schema;

transmitting, upon a determination that the Boolean result is false, an error message indicative of an error in the message body, wherein the message is prevented from reaching the service.

15. The method of claim 14, wherein the schema of the message body comprises a first set of parameters, wherein the reference schema comprises a second set of parameters, and wherein generating said forwarding and transmitting further comprises:

comparing a type of each parameter of the first set of parameters to the type of each corresponding parameter in the second set of parameters.

16. The method of claim 14, wherein the plugin is a browser extension.

17. The method of claim 14, wherein the message is a request to a service of the plurality of services or a response from the service.

* * * * *